(12) United States Patent
Slinker

(10) Patent No.: US 8,906,335 B2
(45) Date of Patent: Dec. 9, 2014

(54) SYSTEM AND METHOD FOR BROAD-AREA SYNTHESIS OF ALIGNED AND DENSELY-PACKED CARBON NANOTUBES

(75) Inventor: Keith A. Slinker, Keller, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 1652 days.

(21) Appl. No.: 12/129,104

(22) Filed: May 29, 2008

(65) Prior Publication Data

US 2009/0297428 A1 Dec. 3, 2009

(51) Int. Cl.
*B01J 19/08* (2006.01)
*D01F 9/12* (2006.01)
*D01C 5/00* (2006.01)
*C01B 31/02* (2006.01)
*B82Y 30/00* (2011.01)
*B82Y 40/00* (2011.01)

(52) U.S. Cl.
CPC ......... *C01B 31/0226* (2013.01); *C01B 31/0206* (2013.01); *C01B 31/0253* (2013.01); *C01B 31/022* (2013.01); *B82Y 30/00* (2013.01); *B82Y 40/00* (2013.01); *C01B 2202/08* (2013.01); *Y10S 977/742* (2013.01); *Y10S 977/843* (2013.01)
USPC .................. 423/445 B; 423/447.1; 423/447.3; 977/742; 977/843

(58) Field of Classification Search
USPC ......... 423/445 B, 447.1, 447.3; 977/742, 843
See application file for complete search history.

(56) References Cited

U.S. PATENT DOCUMENTS

| 5,800,706 | A | 9/1998 | Fischer |
| 6,986,876 | B2* | 1/2006 | Smalley et al. ............ 423/447.1 |
| 7,090,819 | B2 | 8/2006 | Smalley et al. |
| 2002/0150529 | A1 | 10/2002 | Dillon et al. |
| 2003/0102585 | A1 | 6/2003 | Poulin et al. |
| 2005/0176329 | A1 | 8/2005 | Olry et al. |

(Continued)

FOREIGN PATENT DOCUMENTS

| FR | 2844510 A1 | 9/2002 |
| WO | 2006137893 A2 | 12/2006 |
| WO | 2007015710 A2 | 2/2007 |
| WO | 2007/0126412 A2 | 11/2007 |

OTHER PUBLICATIONS

Bower et al., "Plasma-induced alignment of carbon nanotubes," 2000, Applied Physics Letters, vol. 77, No. 6, pp. 830-832.*

(Continued)

*Primary Examiner* — Guinever Gregorio
(74) *Attorney, Agent, or Firm* — Bracewell & Giuliani LLP

(57) ABSTRACT

Broad-area synthesis of aligned and densely-packed carbon nanotubes (CNT) is disclosed. CNT are repeatedly synthesized and then drawn together to locally and globally achieve increased packing densities. The process synthesizes an aligned, relatively sparse forest of CNT on a catalyzed sacrificial substrate. The catalyst is removed, thereby releasing the CNT but leaving them in place on the substrate. A liquid-induced collapse produces regions of more densely packed CNT and regions where no CNT remain. A fresh catalyst is deposited on the exposed regions of the substrate and a sparse forest of aligned CNT is regrown in these regions. The CNT also may form on the tops of the densified regions of CNT. The top-growth CNT may be removed or incorporated into the solid such that the solid is expanded axially. This process, e.g., growth then densification, is repeated to form a near-continuous solid of aligned and densely packed CNT.

21 Claims, 3 Drawing Sheets

(56) References Cited

U.S. PATENT DOCUMENTS

| | | | |
|---|---|---|---|
| 2006/0066202 A1* | 3/2006 | Manohara et al. | 313/311 |
| 2006/0073089 A1 | 4/2006 | Ajayan et al. | |
| 2006/0088848 A1 | 4/2006 | Noca et al. | |
| 2006/0137817 A1 | 6/2006 | Ma et al. | |
| 2006/0183300 A1 | 8/2006 | Mosdale et al. | |
| 2007/0066171 A1 | 3/2007 | Bystricky et al. | |
| 2008/0075954 A1 | 3/2008 | Wardle et al. | |
| 2008/0317660 A1 | 12/2008 | Pan et al. | |
| 2009/0102046 A1* | 4/2009 | Dimitrakopoulos et al. | 257/712 |
| 2010/0159222 A1* | 6/2010 | Hata et al. | 428/218 |
| 2010/0196249 A1* | 8/2010 | Hata et al. | 423/447.2 |
| 2010/0244307 A1* | 9/2010 | Lemaire et al. | 264/171.26 |
| 2012/0205834 A1* | 8/2012 | Lemaire et al. | 264/171.26 |

OTHER PUBLICATIONS

Futaba, Don N., et al., Shape-Engineerable and Highly Densely Packed Single-Walled Carbon Nanotubes and Their Application as Super-Capacitor Electrodes, Nature Materials, vol. 5, Dec. 2006.

Futaba Don N., et al., "Shape-Engineerable and Highly Densely Packed Single-Walled Carbon Nanotubes and Their Application as Super-Capacitor Electrodes," Nature Materials, Dec. 2006, pp. 987-994, vol. 5., Nature Publishing Group, Online at www.nature.com/naturematerials.

Garcia E. J., et al., "Fabrication of Composite Microstructures by Capillarity-Driven Wetting of Aligned Carbon Nanotubes with Polymers," Nanotechnology, Mar. 23, 2007, pp. 1-11, vol. 18, IOP Publishing Ltd., UK, Online at stacks.iop.org/Nano/18/165602.

Li, X., et al., "Bottom-Up Growth of Carbon Nanotube Multilayers: Unprecedented Growth," Nano Letters, Sep. 27, 2005, pp. 1997-2000, vol. 5, No. 10, Published on Web.

Kaur, S., et al., "Capillarity-Driven Assembly of Carbon Nanotubes on Substrates into Dense Vertically Aligned Arrays," Advanced Materials, Sep. 4, 2007, pp. 2984-2987, vol. 19, No. 19, Online at www.advmat.de.

Wirth, C.T., et al., "Surface Properties of Vertically Aligned Carbon Nanotube Arrays," Diamond and Related Materials, Dec. 17, 2007, pp. 1518-1524, vol. 17, No. 7-10, Elsevier Science Publishers, Amsterdam, Online at www.elsevier.com/locate/diamond.

Noy, A., et al., "Nanofluidics in Carbon Nanotubes," Nano Today, Nov. 17, 2007, pp. 22-29, vol. 2, No. 6, Elsevier, Amsterdam.

Zhu, Lingbo, et al., "Aligned Carbon Nanotube Stacks by Water-Assisted Selective Etching," Nano Letters, Nov. 2, 2005, pp. 2641-2645, vol. 5, No. 12, Published on Web.

Wardle, Brian L., et al., Fabrication and Characterization of ultrhigh-Volume-Fraction Aligned Carbon Nanotube-Polymer Composites, Advanced Materials, Jun. 5, 2008, pp. 2707-2714, vol. 20, Online at www.advmat.de.

Partial European Search Report, Application No./ Patent No. 09161587.2-1218/2128085, Reference NMM/ P420459EP, Dated Jul. 20, 2010.

Deck, Christian P. and Vecchio, Kenneth S., "Growth of Well-Aligned Carbon Nanotube Structures in Successive Layers," J. Phys. Chem. B., 2005, pp. 12353-12357, 109, American Chemical Society.

Extended European Search Report; Application No./Patent No. 09161587.2-1218 / 2128085, Reference NMM/ P420459EP; Dated Dec. 16, 2010.

* cited by examiner

SYSTEM AND METHOD FOR BROAD-AREA SYNTHESIS OF ALIGNED AND DENSELY-PACKED CARBON NANOTUBES

BACKGROUND OF THE INVENTION

1. Technical Field

The present invention relates in general to car bon nanotubes and, in particular, to an improve and system and method for broad-area synthesis of aligned and densely-packed carbon nanotubes.

2. Description of the Related Art

Carbon nanotubes (CNT) have excellent structural, thermal and electrical properties, especially along their length. These properties, however, have not been even closely realized on the macro scale. Such a bulk material could be stronger than steel and more conductive than copper but lighter than aluminum. CNT grown on a substrate by chemical vapor deposition (CVD) is a promising synthesis technique since the CNT self-align perpendicular to the substrate resulting in a "forest" of CNT of fairly uniform height. Unfortunately, the packing density per area of the CNT is limited to about 10% for known CVD methods. Since the out-of-plane properties of the bulk CNT product should scale with packing density, it is desirable to pack as many CNT together per area as possible.

Small patches of CNT forests densified by liquid-induced collapse have been demonstrated by a few research groups with an area of 1 square centimeter or less. In particular, D. N. Futaba, et al (Nature Materials, December 2006) physically detached and removed the CNT forest prior to densification; whereas, N. Nicholas et al (unpublished) chemically detached the CNT forest but left it in place on the substrate. In both cases, the coverage area of the densified product was much smaller than the initial undensifed forest area. This was achieved with a single growth step and a single liquid-induced densification step. Although these solutions are viable, they have limited practical application and an improved solution would be desirable.

SUMMARY OF THE INVENTION

Embodiments of a system and method for broad-area synthesis of aligned and densely-packed carbon nanotubes are disclosed. The invention provides a process for realizing the large packing densities of liquid-induced collapse over the broad-areas that are required for many practical applications such as thermal management systems. The coverage area is limited only by the coverage area of the CVD technique implemented.

In some embodiments, the process comprises synthesizing an aligned, relatively sparse forest of carbon nanotubes on a sacrificial substrate. The catalyst may be deposited onto a sacrificial substrate such as an oxidized silicon wafer. Carbon nanotubes are grown on the substrate by, for example, a CVD process. These nanotubes are mostly aligned perpendicular to the substrate with a typical packing density of about 2 to 10%. This array of carbon nanotubes is released from the substrate but left in place on the substrate. In some embodiments, this release is accomplished by chemically removing the catalyst.

A liquid is introduced to draw the nanotubes together. This liquid-induced collapse produces regions of densely packed nanotubes (about 70%) and regions where no nanotubes remain. The perpendicular orientation of the individual nanotubes is maintained at least in part. A fresh catalyst may be deposited on the exposed regions of the substrate if necessary, and a sparse forest of aligned nanotubes is regrown in these regions. The nanotubes also may grow on the tops of the densified regions of nanotubes. These nanotubes grown on the tops of the others may be removed after this step. Alternatively, these nanotubes may be incorporated into the solid such that the solid is expanded into a third dimension (i.e., axially). The latter steps of the process may be repeated until a substantially continuous solid of aligned and densely packed carbon nanotubes is produced.

The foregoing and other objects and advantages of the present invention will be apparent to those skilled in the art, in view of the following detailed description of the present invention, taken in conjunction with the appended claims and the accompanying drawings.

BRIEF DESCRIPTION OF THE DRAWINGS

So that the manner in which the features and advantages of the present invention, which will become apparent, are attained and can be understood in more detail, more particular description of the invention briefly summarized above may be had by reference to the embodiments thereof that are illustrated in the appended drawings which form a part of this specification. It is to be noted, however, that the drawings illustrate only some embodiments of the invention and therefore are not to be considered limiting of its scope as the invention may admit to other equally effective embodiments.

DETAILED DESCRIPTION OF THE INVENTION

Referring to FIGS. 1-8, embodiments of a system and method for broad-area synthesis of aligned and densely-packed carbon nanotubes are disclosed. The invention is particularly well suited for products that would benefit from an increased density of nanotubes, such as energy storage and structural applications, with the added benefit of alignment to maximize the high thermal and electrical conductivity of the individual nanotubes on a bulk scale. The latter is relevant for thermal management, heat-to-power, or any application where it is desirable to quickly move heat from one surface to another.

Figure 1:
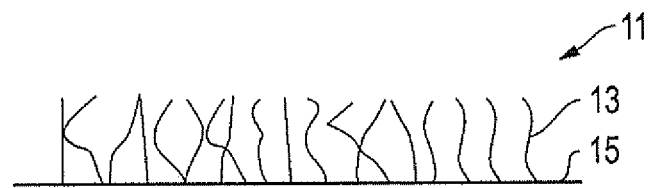
FIGS. 1-8 are schematic side views of various embodiments of method steps performed in accordance with the invention.
Figure 2:
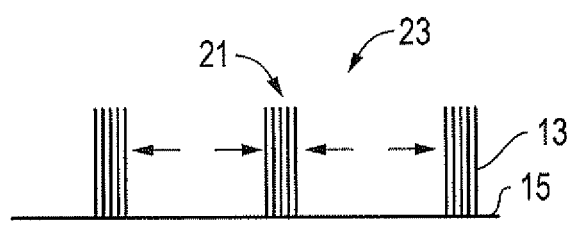

In some embodiments, the invention comprises a method of forming carbon nanotubes (CNT). For example, a catalyst is initially deposited on a substrate, such as a sacrificial substrate comprising an oxidized silicon wafer. As shown in FIG. 1, a substantially aligned, relatively sparse forest 11 of CNT 13 is synthesized on the substrate 15. This may comprise a chemical vapor deposition (CVD) process and the CNT are substantially aligned perpendicularly relative to the substrate with a typical packing density of about 2% to 10%.

The CNT forest 11 is released from the substrate 15 in place through such means as removing or releasing the catalyst (e.g., chemically), heating or thermally affecting the system, or physical contact, release or removal. Even though the CNTs are sparse and substantially aligned, the forest is self-supporting due to entanglement and attractive forces between neighboring nanotubes.

A liquid may be introduced to draw the CNT together (FIG. 2) to form regions 21 of densely-packed CNT on the substrate 15, and bare or sparse regions 23 of CNT on the substrate 15. The bare regions 23 may comprise relatively few or no CNT. The CNT extend in a substantially axial direction, such that radial spaces are formed between the regions of densely-packed CNT. This step is a liquid-induced collapse of the CNT and forms a packing density of about 50% to 70%. The substantially perpendicular orientation of the CNT is effectively maintained in some embodiments.

Figure 3:
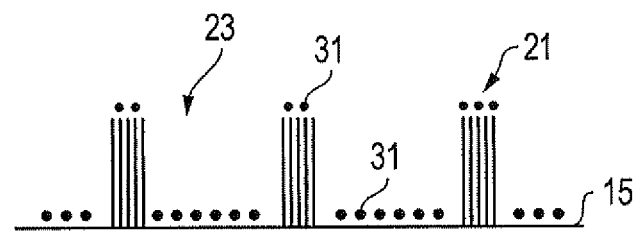
Figure 4:
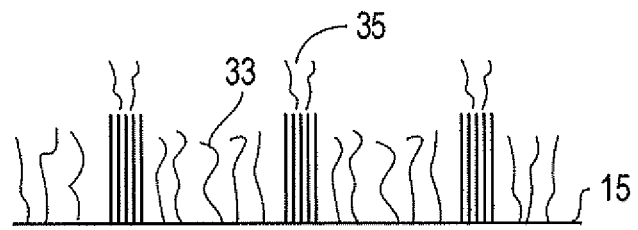

As shown in FIG. 3, in some embodiments the method includes depositing the catalyst 31 (e.g., the same catalyst or a different one) on at least the bare regions 23 of CNT on the substrate 15. The catalyst 31 also may be applied to the tops of the CNT in the regions 21 of densely-packed CNT. As illustrated in FIG. 4, additional CNT 33 may be grown in the bare regions 23 (i.e., radial spaces) of previously-formed CNT between the regions 21 of densely-packed CNT on the substrate 15 such that CNT growth occurs in a relatively axial direction relative to the CNT. Thus, additional sparse forests of aligned CNT 33 are synthesized in the previously bare regions 23 of CNT on the substrate. In some embodiments, CNT growth 35 also occurs on the tops of the previously-formed CNT.

Figure 5:
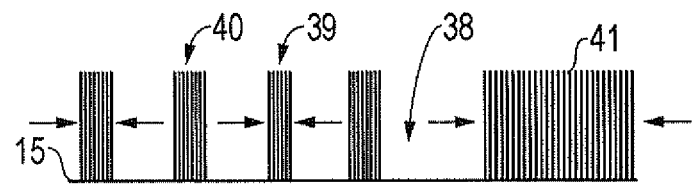

As shown in FIG. 5, the sparse forest regions may again be released from the substrate, and a liquid again introduced to densify the sparse regions. The nanotubes may be drawn together by the liquid to form new regions of densely-packed CNT 39 that are isolated from the previously-formed, densely-packed CNT regions 40. The CNT also may be drawn together with the previously-formed, densely-packed CNT by the liquid, thereby increasing the overall radial area of such regions of CNT 41.

Figure 6:
Figure 7:
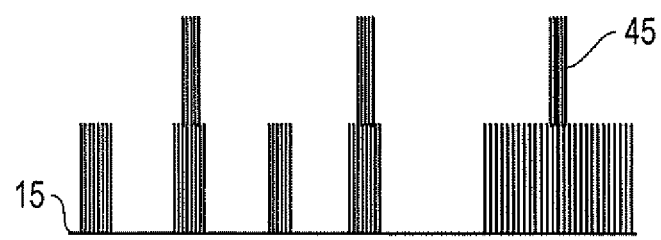
Figure 8:
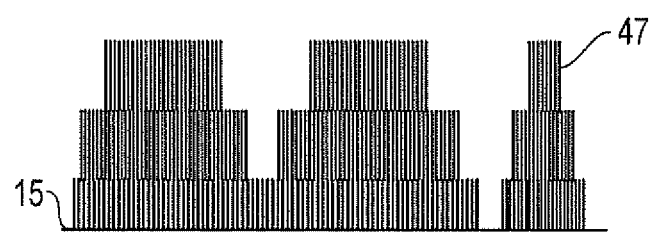

In some embodiments, these latter steps are then repeated to further fill in the remaining bare regions 38 with densely-packed regions of CNT 43 (FIG. 6) and form a substantially continuous solid. FIGS. 5 and 6 depict embodiments wherein the CNT growth 35 has not occurred or is removed. However, as shown in FIGS. 7 and 8, the CNT growth may be densified as shown at CNT regions 45, and incorporated into the solid (FIG. 8) such that the solid is further expanded axially as shown by reference numeral 47.

In still other embodiments, the method further comprises the step of infusing the substantially continuous solid with a second or additional materials to manipulate physical properties thereof. The method may still further comprise the step of forming a plurality of the substantially continuous solids and stacking and joining the substantially continuous solids (with or without removal from the growth substrate).

As described herein, various embodiments of the nanotube product may be used as-is or infused with other materials (as determined by the final application) to further improve its properties. Whether or not it is infused, the solid may be stacked and joined with identically prepared films (with or without removal from the growth substrate) to achieve a three-dimensional product as described herein.

In some embodiments, the desirable increase in packing density is achieved globally with few or no bare regions. As a result, the size of this extremely dense nanotube forest or solid is fully scalable in area up to the limits of the CVD synthesis technique utilized. Conversely, previously demonstrated processes greatly reduce the coverage area and leave most of the area without nanotubes.

In an alternate embodiment, the invention comprises a method for large scale production of the previously described processes. Multiple, small densified patches may be fabricated by these processes. The patches may be physically repositioned next to each other to form a "tiled" semi-continuous solid. Some embodiments of the previously described regrowth and redensification (RR) solution has the following advantages over the tiled solution:

1. The assembly of the small patches or tiles may be more laborious for some applications. However, the RR process does not require direct handling of the nanotubes such that the final product may be achieved purely by self-assembly.

2. The tiles should be attached to each other for some applications. In some embodiments, a second material is introduced to facilitate this attachment. In the RR process, the repeated densification naturally draws neighboring regions of nanotubes together.

While the invention has been shown or described in only some of its forms, it should be apparent to those skilled in the art that it is not so limited, but is susceptible to various changes without departing from the scope of the invention.

What is claimed is:

1. A method of forming carbon nanotubes (CNT), comprising:
    (a) depositing a catalyst on a substrate;
    (b) synthesizing a substantially aligned, initial sparse forest of CNT on the substrate;
    (c) releasing the initial sparse forest of CNT from the substrate but leaving the initial sparse forest of CNT in place on the substrate; then
    (d) while the released initial sparse forest of CNT is still on the substrate, introducing a liquid to draw the CNT together to form regions of densely-packed CNT on the substrate and bare regions of CNT on the substrate previously occupied by the portions of the initial sparse forest; and
    (e) synthesizing secondary sparse forests of substantially aligned CNT in the bare regions of CNT on the substrate; and
    (f) repeating steps (c) through (e) to further densify the CNT and form a substantially continuous solid
    wherein step (d) comprises a performing a liquid-induced collapse of the CNT in the initial sparse forest, resulting in a typical packing density of about 50% to 70% in the regions of densely packed CNT, and the perpendicular orientation of the CNT is substantially maintained in the regions of densely packed CNT.

2. A method according to claim 1, wherein the substrate is a sacrificial substrate comprising an oxidized silicon wafer.

3. A method according to claim 1, wherein step (b) is a CVD process and the CNT in the initial sparse forest are substantially aligned perpendicularly relative to the substrate with a packing density of about 10% at the conclusion of step (b).

4. A method according to claim 1, wherein step (c) comprises releasing the initial sparse forest of CNT with a method selected from the group consisting of chemical removal of the catalyst, thermal release, and physical release.

5. A method according to claim 1, wherein at the conclusion of step (d) and before step (e), in at least some of the bare regions, there are substantially no CNT on the substrate.

6. A method according to claim 1, wherein the CNT extend in a direction substantially normal to the surface of the substrate on which the CNT are synthesized, and step (d) comprises forming the bare regions between adjacent the regions of densely-packed CNT.

7. A method according to claim 1, wherein step (e) comprises growing CNT on tops of previously-formed CNT in the regions of densely-packed CNT on the substrate such that CNT growth on the previously-formed CNT occurs in an axial direction relative to axes of the previously-formed CNT.

8. A method according to claim 7, wherein the CNT growth is removed from the substrate after step (f).

9. A method according to claim 7, wherein the CNT growth is incorporated into the solid such that the solid is expanded axially.

10. A method according to claim 1, further comprising the step of infusing the substantially continuous solid with a second material.

11. A method according to claim 1, further comprising the step of forming a plurality of the substantially continuous solids and stacking and joining the substantially continuous solids.

12. A method according to claim 1, further comprising, after step (d) and before step (e), depositing a second catalyst on at least the bare regions on the substrate.

13. A method according to claim 12, wherein the second catalyst comprises a same catalyst as is deposited in step (a).

14. A method of forming carbon nanotubes (CNT), comprising:
(a) depositing a catalyst on a substrate;
(b) synthesizing a substantially aligned, sparse forest of CNT on the substrate;
(c) removing the catalyst from the substrate to release the CNT from the substrate but leaving the CNT in place on the substrate;
(d) introducing a liquid to cause a liquid-induced collapse of the CNT, wherein some of the CNT slide across portions of the substrate and draw together to form regions of densely-packed CNT on the substrate separated by bare regions on the substrate previously occupied by some of the CNT, the liquid-induced collapse of the CNT resulting in a typical packing density of about 50% to 70% in the regions of densely-packed CNT;
(e) while the regions of densely-packed CNT remain on the substrate, depositing the catalyst on at least the bare regions on the substrate;
(f) synthesizing additional sparse forests of aligned CNT in the bare regions on the substrate; and
(g) repeating steps (c) through (f) to further densify the CNT and form a substantially continuous solid.

15. A method according to claim 14, wherein the substrate is a sacrificial substrate comprising an oxidized silicon wafer.

16. A method according to claim 14, wherein step (b) is a CVD process and the CNT in the sparse forest are substantially aligned perpendicularly relative to the substrate with a packing density of about 10%.

17. A method according to claim 14, wherein step (c) comprises removing the catalyst with a method selected from the group consisting of chemical, thermal and physical removal, and step (e) comprises depositing the same catalyst as in step (a).

18. A method according to claim 14, wherein at least some of the bare regions contain no CNT on the substrate.

19. A method according to claim 14, wherein the CNT extend in a substantially axial direction perpendicular to a surface of the substrate, and step (d) comprises forming the bare regions adjacent and between the regions of densely-packed CNT.

20. A method according to claim 14, wherein step (f) comprises growing CNT on tops of previously-formed CNT in the regions of densely-packed CNT on the substrate such that CNT growth occurs in an axial direction relative to axes of the CNT, the CNT growth is removed from the substrate after step (g); and the CNT growth is incorporated into the solid such that the solid is expanded axially.

21. A method according to claim 14, further comprising the steps of infusing the substantially continuous solid with a second material, and forming a plurality of the substantially continuous solids and stacking and joining the substantially continuous solids.

* * * * *